3,026,345
PROCESS FOR PRODUCING DIALKYL ALUMINUM HYDRIDES

Elmer H. Dobratz, Pittsburgh, Pa., assignor to Koppers Company, Inc., a corporation of Delaware
No Drawing. Filed Feb. 5, 1958, Ser. No. 713,311
9 Claims. (Cl. 260—448)

This invention relates to a process for producing dialkyl aluminum hydrides.

Fully alkylated aluminum compounds are being widely used to provide polymerization catalysts, particularly for the polymerization of ethylene. Inasmuch as the fully alkylated aluminum compound can be formed by the addition of an alpha or terminally unsaturated olefin to the dialkyl aluminum hydride, need exists for an efficient, economical and straightforward process for the production of this intermediate compound, dialkylaluminum hydride.

Dialkyl aluminum hydrides have been prepared heretofore by action on the fully alkylated aluminum compound. Thus, for example, trimethyl aluminum, $(CH_3)_3Al$, has been subjected to a glow discharge in the presence of hydrogen and the dialkylaluminum hydride, dimethyl aluminum hydride, $(CH_3)_2AlH$, in this case, recovered from the reaction product. Alkylaluminum hydrides have also been prepared by reaction of the fully alkylated aluminum compounds with lithium hydride. In one process, diethylaluminum hydride has been prepared by the reaction of triethylaluminum with aluminum metal and hydrogen at superatmospheric pressures up to about 300 atmospheres.

It is, therefore, an object of this invention to provide a direct process for the production of dialkyl aluminum hydrides from aluminum, hydrogen, and an alpha olefin.

It has now been found that dialkylaluminum hydrides can be prepared by the reaction of an alpha olefin directly with hydrogen and aluminum metal which has been activated and which is suspended in liquid medium.

Although the exact mechanism or mechanisms for the reaction of aluminum with the alpha olefin and hydrogen to form dialkylaluminum hydride has not been established, for practical purposes, the overall reaction can be represented by the following equations.

$$2RR'C=CH_2 + Al + 3/2 H_2 \rightarrow (RR'CH-CH_2)_2AlH$$

where R and R' may be an alkyl group, an aryl group, or hydrogen. In all probability, the reaction and its course are better described by the following series of reactions.

(1)  $Al + 3/2 H_2 \rightleftharpoons AlH_3$
(2)  $AlH_3 + RR'C=CH_2 \rightarrow RR'CH-CH_2AlH_2$
(3)  $RR'CH-CH_2AlH_2 + RR'C$
$=CH_2 \rightarrow (RR'CH-CH_2)_2AlH$ also (4)  $2 RR'CH-CH_2AlH_2 \rightarrow (RR'CHCH_2)_2AlH + AlH_3$ Effectively, hydrogen absorbed on the aluminum surface might be considered as aluminum hydride which reacts with a molecule of 1-olefin to produce a molecule of alkylaluminum hydride. The absorption of the molecule of olefin might then weaken the bond between the aluminum mass and the particular aluminum atom involved, causing it to break loose as an individual alkylaluminum hydride molecule. The addition of another molecule of 1-olefin to the alkylaluminum dihydride then results in the formation of a molecule of dialkylaluminum hydride. While the reaction of Equation 4 is postulated, little evidence of the existence of alkylaluminum dihydride has been found in the reaction product; so it must either be unstable under the reaction conditions or else react so rapidly with more alpha olefin that dialkylaluminum hydride is essentially the only hydride obtained. The reactions of Equations 1 and 2 appears to be the rate controlling factors since the time required for the reaction is dependent upon both the degree of subdivision and the degree of activation of the aluminum used.

A competing reaction of the hydrogen and the alpha olefin results in 2–10 percent of the olefin being converted to the saturated hydrocarbon, and can be represented by the following equation:

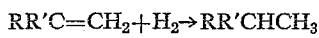
$$RR'C=CH_2 + H_2 \rightarrow RR'CHCH_3$$

So far as can be determined, any alpha or 1-olefin may be used in the process. Alpha olefins with as many as twenty carbon atoms can be readily converted to alkyl aluminum hydrides. However, the higher the number of carbon atoms in the 1-olefin, the slower the reaction; so it is advantageous to use those 1-olefins having from 2–5 carbon atoms.

The reaction in accordance with this invention works well with commercial grades of hydrogen and 1-olefins. Commercial hydrogen has been found to be 99.75–99.8 percent hydrogen, the impurities being primarily oxygen. While as far as is known small quantities of oxygen and moisture do not inhibit the reaction, oxygen and moisture do destroy the product; oxygen through oxidation of the products to alkoxides and moisture through hydrolysis of the products to aluminum hydroxide or oxide and hydrocarbons. Although the intermediate aluminum alkoxides and alkylaluminum oxides do not interfere with the reaction, they are appreciably soluble in the product; and, therefore, efforts should be made to minimize the amount of oxygen and moisture entering the system.

As is well known, aluminum rapidly forms a closely adhering oxide film on its surface when a surface is exposed to air; this renders the aluminum inactive. Thus, it has been found that no reaction takes place according to the foregoing equations until the surface of the aluminum is "activated." Activation of the aluminum, i.e., removal of the oxide film so as to expose the aluminum metal itself to attack, may be accomplished by any of the well-known methods: the aluminum, for example, may be milled under a protective liquid; the aluminum may be sprayed through an inert atmosphere into a protective liquid, such as an aluminum alkyl or a hydrocarbon solution of an aluminum alkyl; or by the method described in my copending application Serial No. 521,901 of heating this aluminum in the presence of an aluminum alkyl and hydrogen or an alkyl aluminum hydride and hydrogen.

Any activated aluminum can be used in the process of this invention; preferably the aluminum should be in a finely divided state. In the practice of this invention, any commercially available comminuted aluminum can be used so long as this comminuted aluminum is activated as in accordance with the aforementioned copending application. The process has been operated successfully with commercial comminuted aluminums such as flaked aluminum turnings, and aluminum powders such as aluminum powder No. 101, No. 120, and No. 322 sold by the Aluminum Company of America. The so-called "grained aluminum," however, has been found to be less satisfactory than other commercially available powders.

In the process of this invention, it has been found advantageous to use an excess of aluminum. Since the controlling factor is apparently the area of aluminum surface exposed, the reaction duration is greatly reduced by the use of an excess of aluminum. The quantity of excess aluminum used is limited only by the fluidity of the resulting slurry in the suspension medium; the fluidity of the slurry should be sufficient for efficient agitation. It has been found that by using an appropriate aluminum powder, slurries which containing as much as 50–60 percent aluminum can be stirred freely. The use of excess aluminum is particularly advantageous in semi-continuous and completely continuous operations since it affords a means of activating aluminum "in situ" as will be described in the examples hereinafter.

The liquid medium may be the dialkyl aluminum hydride, itself, or a solution of the dialkylaluminum hydride in a solvent, for example, an aliphatic hydrocarbon such as hexane and heptane or an aromatic hydrocarbon such as benzene and toluene. When a liquid medium other than the dialkyl aluminum is used, it is advantageous to have 3 to 10% of the dialkylaluminum hydride initially present in the solution in the liquid medium. The dialkylaluminum hydride product may be purified further as by distillation, or the product solution decanted from the reactor can be used directly under other conditions as the intermediate for the preparation of other compounds, such as the fully alkylated aluminum compound.

The reactions involved in the process of the invention take place slowly at 60° C. and become more rapid as the temperature increases. At a temperature of 250° C., the reaction proceeds rapidly but is accompanied by the formation of large quantities of saturated hydrocarbons. Advantageously the reaction is carried out between 130 and 140° C.

The gaseous pressures employed in the reactor can vary over a wide range, and the upper limit is primarily one of practical application determined by the structural features of the apparatus. It has been found that the process of the invention can be practiced with pressures of from 100 lbs. to 15,000 lbs. The advantageous range of pressures however, is from 500 to 2500 lbs. per square inch.

The residence time varies with the 1-olefin, the pressure, the temperature, and the amount and physical characteristics of the aluminum.

The rate of reaction of the process is advantageously promoted by the addition of an alkali or alkaline earth metal, such as lithium, sodium, potassium, rubidium, cesium, calcium, and barium, from Groups IA and IIA of the periodic table and/or the alkaline compounds thereof, such as their carbonates, bicarbonates, hydroxides, and acetates. Such promoters can be used to the extent of from 0.01 to 10% based on the total weight of the suspension medium used. The smaller quantity exhibits less promoting effect and the larger quantity tends to destroy the aluminum alkyl. The preferred range of promoter is from 0.1 to 0.2% based on the weight of the suspension medium.

The process of this invention is advantageously carried out in an autoclave made of stainless steel and having a working pressure of at least 1500 lbs. per square inch. The autoclave should be equipped with an agitator, a pressure gauge, at least two gas inlets, and an adequate port for charging and discharging solids and liquids. The autoclave can conveniently be heated electrically and controlled as to temperature with an automatic temperature recorder-controller. The autoclave should be dried and freed of air before it is used. The drying and purging can conveniently be accomplished simultaneously by heating the autoclave to about 140° C.–150° C. and alternately pressurizing it to 300–400 lbs. per square inch with dry nitrogen and venting the nitrogen. Four to five such flushings have been found to be sufficient to dry the autoclave and essentially free it of air. The autoclave, after cooling, is ready for use.

The invention is further illustrated by the following examples.

EXAMPLE I

To the autoclave described above is charged 1000 parts of diethylaluminum hydride, 1000 parts of a finely comminuted commercial aluminum powder, such as aluminum powder No. 101 supplied by the Aluminum Company of America, and 1.5 parts of technical grade sodium hydroxide pellets. The agitator of the autoclave is started, and the autoclave is sealed and pressurized to approximately 1000 lbs. per square inch with hydrogen. The autoclave and its contents are heated to 135° C. where a pressure of approximately 1400 pounds per square inch develops. The pressure is then adjusted to 1500 pounds per square inch by admitting more hydrogen. The autoclave is maintained at 135° C. for about five hours, the pressure during this period remains essentially constant. Activation of the aluminum is now complete.

Hydride Production

While maintaining the temperature of the autoclave at 135° C., 750 parts of ethylene from a compressor or a suitable ethylene reservoir, maintained at a higher pressure than the autoclave, is added over a period of about four hours. It is desirable to use a flow meter to help maintain a constant feed rate of ethylene. It is also desirable to feed the ethylene more slowly during the first hour since initially the surface area of the aluminum is limited; but as the result of chemical attack the active surface area of the aluminum increases and the reaction proceeds more rapidly. Upon starting the ethylene feed, a slight increase in the autoclave pressure is at times observed; but the pressure soon begins to fall. The pressure in the autoclave is maintained at 1500 pounds per square inch by feeding hydrogen to the autoclave through a pressure regulator. If periodically the hydrogen flow is interrupted without stopping the ethylene flow, the rate of pressure drop in the autoclave is an indication of the hydrogen consumption. Immediately after completion of the ethylene addition, the hydrogen flow rises sharply as the partial pressure of ethylene in the autoclave decreases, then falls rapidly, tapers off, and in about an hour ceases completely. The reaction is now complete. The autoclave is then cooled to 80–90° C. and the gases are vented through a trap cooled with liquid-nitrogen where approximately 50–60 grams of ethane is collected. The agitation is stopped. After settling about an hour a discharge tube is inserted into the autoclave to a point about 1 inch above the settled, excess aluminum and the diethylaluminum hydride product is discharged from the autoclave into a purged receiver by applying sufficient nitrogen pressure (1 to 2 pounds per square inch) to the autoclave. Approximately 1050–1100 parts of diethylaluminum hydride, containing in suspension 1–2 percent by weight of aluminum and trace metals is obtained. Upon standing the suspended metals settle from the product, leaving a clear, colorless liquid that can be recovered by decantation or filtration.

There remains in the autoclave approximately 650 parts of aluminum and about 1000 parts of diethylaluminum hydride. The autoclave is pressurized to about 1000 pounds per square inch with hydrogen and heated to 135° C. where the pressure is adjusted to and controlled at aobut 1500 pounds per square inch by means of a hydrogen pressure regulator. Approximately 1100 parts of ethylene is then fed to the atuoclave over a period of 3.5 to 4 hours. After hydrogen absorption is complete (which requires about another hour), the autoclave is cooled and vented as described above, and about 70–80 parts of ethane are obtained. At this point, about 150–160 parts of aluminum remain. After settling, 2100 parts of diethylaluminum hydride can be discharged directly from the autoclave. From the slurry which remains in the autoclave, an additional 300–400 parts of diethylaluminum hydride can be obtained by extracting the residue in the autoclave with an inert solvent such as heptane or benzene and then distilling off the solvent. About 150–160 parts of aluminum remain. Thus of the total 3500 parts of diethylaluminum hydride obtained, about 2500 parts is net production.

EXAMPLE II

The process of Example I is repeated but, instead of completely discharging the autoclave, only about 1500 parts of diethylaluminum hydride is discharged thereby leaving approximately 1000 parts of the dialkyl aluminum hydride in the autoclave. About 850 parts of fresh aluminum and 1.5 parts of technical grade sodium hydroxide are charged to the autoclave and the entire production procedure repeated as described above. Operating in this manner, the only aluminum lost is that discharged with the product, and the production process can be repeated indefinitely.

EXAMPLE III

To a 1.4 gallon autoclave of the type described above is added 1819 grams of diethylaluminum hydride, 1800 grams of Alcoa aluminum powder No. 101, and 2.7 grams of technical grade sodium hydroxide. The agitator of the autoclave is started and the autoclave is sealed and pressurized to approximately 1000 pounds per square inch with hydrogen. The autoclave and its contents are heated at 135° C. where a pressure of approximately 1460 pounds per square inch develops. The pressure is then adjusted to 1500 pounds per square inch by admitting more hydrogen. The autoclave is maintained at 135° C. for about 5 hours. Activation of the aluminum is now complete.

While maintaining the temperature of the autoclave at 135° C. 749 parts of ethylene is fed into the autoclave over a period of 3.6 hours. The pressure during this time is maintained at about 1530 pounds per square inch by the addition of hydrogen and the temperature at about 130–135° C. The autoclave is maintained at this temperature for another 1.4 hours. The liquid in the autoclave at this time has reached a predetermined level. The autoclave is then cooled to about 85° C. and vented through a trap cooled with liquid nitrogen. Approximately 74 grams of ethane is recovered from the trap. The diethylaluminum hydride is discharged to a predetermined level which level leaves sufficient dialkylaluminum hydride in the vessel to suspend the aluminum. About 1630 grams of dialkylaluminum hydride is thus recovered. To the residual slurry in the autoclave are charged 324 grams of aluminum powder and 1.6 grams of sodium hydroxide. The autoclave is pressurized to about 1000 lbs. per square inch with hydrogen and heated to 132° C. The pressure is brought up to 1510 pounds per square inch and 1357 grams of ethylene is fed into the autoclave over a period of 4.25 hours while maintaining the autoclave under this pressure and temperature. The autoclave is maintained at this pressure and temperature for another hour then cooled to 85° C. The gases are vented through a trap cooled with liquid nitrogen and approximately 41 grams of ethane recovered. 1869 grams of diethylaluminum hydride is siphoned from the autoclave.

To the residual slurry in the autoclave are charged 615 grams of aluminum and 1.6 grams of sodium hydroxide. The autoclave is pressurized to about 1000 pounds per square inch with hydrogen and heated to 133° C. The pressure is brought up to 1520 pounds per square inch and 1311 grams of ethylene is fed into the autoclave over a period of 4.0 hours while maintaining the autoclave under this pressure by the addition of hydrogen and temperature. The autoclave is maintained at this pressure and temperature for another 1.25 hour then cooled to 85° C. The gases are vented through a trap cooled with liquid nitrogen and approximately 47 grams of ethane recovered. 1651 grams of diethylaluminum hydride is siphoned from the autoclave.

To the residual slurry in the autoclave, 539 grams of aluminum and 1.6 grams of sodium hydroxide are charged. The autoclave is pressurized to about 1000 pounds per square inch with hydrogen and heated to 132° C. The pressure is brought up to 1520 pounds per square inch and maintained thereat by the addition of hydrogen and 1376 grams of ethylene is fed into the autoclave over a period of 4.0 hours while maintaining the autoclave under this pressure and temperature. The autoclave is maintained at this pressure and temperature for another 1.7 hours then cooled to 85° C. The gases are vented through a trap cooled with liquid nitrogen and approximately 62 grams of ethane recovered. 1728 grams of diethylaluminum hydride is siphoned from the autoclave.

To the residual slurry in the autoclave, 567 grams of aluminum and 1.6 grams of sodium hydroxide are charged. The autoclave is pressurized to about 1000 pounds per square inch with hydrogen and heated to 131° C. The pressure is brought up to 1510 pounds per square inch and maintained thereat by the addition of hydrogen and 1376 grams of ethylene is fed into the autoclave over a period of 4.0 hours while maintaining the autoclave under this pressure and temperature. The autoclave is maintained at this pressure and temperature for another 1.4 hours then cooled to 85° C. The gases are vented through a trap cooled with liquid nitrogen and approximately 74 grams of ethane recovered. 1747 grams of diethylaluminum hydride is siphoned from the autoclave.

To the residual slurry in the autoclave, 578 grams of aluminum and 1.6 grams of sodium hydroxide are charged. The autoclave is pressurized to about 1000 pounds per square inch with hydrogen and heated to 132° C. The pressure is brought up to 1520 pounds per square inch and 1362 grams of ethylene is fed into the autoclave over a period of 4.0 hours while maintaining the autoclave under this pressure and temperature as above. The autoclave is maintained at this pressure and temperature for another 1.5 hours then cooled to 85° C. The gases are vented through a trap cooled with liquid nitrogen and approximately 64 grams of ethane is recoverd. 1768 grams of diethylaluminum hydride is siphoned from the autoclave.

To the residual slurry in the autoclave, 584 grams of aluminum and 1.6 grams of sodium hydroxide are charged. The autoclave is pressurized to about 1000 pounds per square inch with hydrogen and heated to 132° C. The pressure is brought up to 1510 pounds per square inch and 1407 grams of ethylene is fed into the autoclave over a period of 4.0 hours while maintaining the autoclave under this pressure and temperature as above. The autoclave is maintained at this pressure and temperature for another 1.5 hour then cooled to 85° C. The gases are vented through a trap cooled with liquid nitrogen and approximately 84 grams of ethane recovered. 1934 grams of diethylaluminum hydride is siphoned from the autoclave.

To the residual slurry in the autoclave, 638 grams of aluminum and 1.6 grams of sodium hydroxide are charged. The autoclave is pressurized to about 1000 pounds per square inch with hydrogen and heated to 130° C. The pressure is brought up to 1500 pounds per square inch and 390 grams of ethylene is fed into the autoclave over a period of 1.75 hours while maintaining the autoclave under this pressure and temperature as above. Because of a plugged ethylene feed line it was necessary to stop this run early. The autoclave, however, is maintained at this pressure and temperature for another hour then cooled at 85° C. The gases are vented through a trap cooled with liquid nitrogen and approximately 34 grams of ethane recovered. 455 grams of diethylaluminum hydride is siphoned from the autoclave.

To the residual slurry in the autoclave, 150 grams of aluminum and 0.8 grams of sodium hydroxide are charged. The autoclave is pressurized to about 1000 pounds per square inch with hydrogen and heated to 130° C. The pressure is brought up to 1525 pounds per square inch and 1298 grams of ethylene is fed into the autoclave over a period of 4.0 hours while maintaining the autoclave under this pressure and temperature as above. The autoclave is maintained at this pressure and temperature for another 1.5 hours then cooled to 85° C. The gases are vented through a trap cooled with liquid nitrogen and approximately 88 grams of ethane is recovered. 1726 grams of diethylaluminum hydride is siphoned from the autoclave.

To a residual slurry in the autoclave, 570 grams of aluminum and 1.6 grams of sodium hydroxide are charged. The autoclave is pressurized to about 1000 pounds per square inch with hydrogen and heated to 130° C. The pressure is brought up to 1500 pounds per square inch and 1385 grams of ethylene is fed into the autoclave over a period of 3.0 hours while maintaining the autoclave under this pressure and temperature as above. The autoclave is maintained at this pressure and temperature for another 2.5 hours then cooled to 85° C. The gases are vented through a trap cooled with liquid nitrogen and approximately 92 grams of ethane is recovered. 2215 grams of diethylaluminum hydride is siphoned from the autoclave. The production was stopped each time, except one, due to the liquid in the autoclave reaching a predetermined level. This process could be carried on indefinitely.

EXAMPLE IV

The procedure of Example I is repeated with the exception that instead of diethylaluminum hydride, 1000 parts of di-n-propylaluminum hydride is initially charged to the autoclave and in the production runs following the aluminum activation instead of ethylene, an equal weight of propylene is fed to the autoclave. The reaction proceeds similarly to that described in Example I. Because of the higher molecular weight of propylene it is possible to carry out three production runs of di-n-propylaluminum hydride, one in which 750 parts of propylene is added to the autoclave and two in which 1000 parts of propylene is added to the autoclave. In addition to the initial charge to the autoclave there is obtained about 3200–3300 parts of di-n-propylaluminum hydride of 95–97% purity. There is also obtained about 250 parts of propane.

EXAMPLE V

The procedure of Example I is repeated with the exception that instead of diethylaluminum hydride, 1000 parts of diisobutyl aluminum hydride is initially charged to the autoclave for the activation of the aluminum and in the production runs following the aluminum activation, instead of ethylene an equal weight of isobutylene is fed to the autoclave. The reaction proceeds similarly to that described in Example I. Because of the higher molecular weight of isobutylene it is possible to carry out four production runs of diisobutylaluminum hydride, one in which about 750 parts of isobutylene is fed to the autoclave and three in which about 1000 parts of isobutylene is fed to the autoclave. In addition, to the initial charge in the autoclave, there is obtained about 4300 parts of diisobutylaluminum hydride of 97–98% purity.

EXAMPLE VI

The procedure of Example V is repeated with the exception that d-n-butylaluminum hydride is substituted for diisobutylaluminum hydride and 1-butene is substituted for isobutylene. The results are similar. Approximately 4200 parts of di-n-butylaluminum is obtained.

EXAMPLE VII

The procedure of Example V is repeated with the exception that in the production runs liquid isobutylene is charged all at one time before pressurizing with hydrogen. The results are similar. Over a series of four production runs approximately 4200 parts of diisobutylaluminum hydride is obtained.

EXAMPLE VIII

The procedure of Example I is repeated with the exception that instead of diethylaluminum hydride, 1000 parts of di-n-pentylaluminum hydride is initially charged to the autoclave for the activation of the aluminum; and in the production runs following the aluminum activation instead of ethylene, an equal weight of 1-pentene is charged to the autoclave. Because of the higher molecular weight of 1-pentene it is possible to carry out five production runs of di-n-pentylaluminum hydride, one in which 750 parts of 1-pentene are fed to the autoclave and four in which 1000 parts of 1-pentene are fed to the autoclave. Although the production runs require 6–7 hours, the reaction proceeds similarly to that described in Example I. There is obtained about 5200 parts of di-n-pentylaluminum hydride in addition to the initial charge to the autoclave. There is also obtained about 500-600 parts of n-pentane.

The foregoing has presented a novel process for the direct preparation of an alkyl aluminum hydride by the reaction of an alpha olefin, aluminum and hydrogen. The process has been described as a batch and a semi-continuous process although it is obvious that the process can be performed continuously as well.

While the invention has been described with particular embodiments thereof, it will be understood that in its broadest aspects, the invention may be variously embodied within the scope of the invention as set forth herein and in the appended claims.

What is claimed is:

1. A process for the production of an alkyl aluminum hydride comprising forming a reaction mixture and then reacting said reaction mixture of inactive aluminum, hydrogen, an aluminum compound selected from the class consisting of aluminum alkyls and alkyl aluminum hydrides and sodium hydroxide, adding an alpha olefin of from two to ten carbon atoms to said reaction mixture thereby forming alkyl aluminum hydride by the reaction of said olefin with said aluminum compound and hydrogen and activating additional aluminum.

2. The process of claim 1 wherein the reaction is carried out in a liquid medium.

3. The process of claim 2 wherein the liquid medium is a liquid hydrocarbon.

4. The process of claim 2 wherein the liquid initially contains about three percent of a dialkyl aluminum hydride.

5. The process of claim 1 wherein the reaction is carried out at a temperature within the range of from 60° C. to 250° C.

6. The process of claim 1 wherein the reaction is carried out at a pressure within the range of from 100 pounds per square inch to 15,000 pounds per square inch.

7. A process for the preparation of a dialkylaluminum hydride which comprises forming a suspension of aluminum which is normally inactive due to exposure to air and moisture with a dialkylaluminum hydride in the presence of sodium hydroxide, contacting hydrogen with said suspension until the aluminum becomes activated, thereafter adding an alpha olefin and hydrogen to said suspension, whereby a dialkylaluminum hydride is formed by the reaction of the aluminum with the hydrogen and alpha olefin, withdrawing the hydride formed, leaving a slurry of aluminum suspended in the dialkylaluminum hydride, adding more inactive aluminum to said slurry and continuing to add hydrogen and said alpha olefin to said slurry whereby said aluminum becomes activated and reacts with the hydrogen and olefin to form a dialkylaluminum hydride.

8. A process for the preparation of a dialkylaluminum hydride in a reaction zone which comprises forming a slurry of aluminum activated by reaction with a dialkyl aluminum hydride in the presence of sodium hydroxide with a liquid dialkylaluminum hydride of such consistency that the aluminum will be suspended in said liquid upon agitation, agitating said suspension while adding hydrogen and an alpha olefin thereto whereupon said olefin and hydrogen react directly with said aluminum to form more dialkylaluminum hydride, after a predetermined quantity of dialkylaluminum hydride has been formed but before all the aluminum has reacted, withdrawing this quantity from the reaction, adding sufficient aluminum, which may be inactive, to the remaining hydride to replace the aluminum consumed by the reaction, and repeating the process whereupon the last mentioned aluminum becomes activated to react with said olefin and hydrogen.

9. The process of claim 8 wherein the sodium hydroxide is added to the dialkylaluminum hydride with the aluminum.

References Cited in the file of this patent

UNITED STATES PATENTS

| | | |
|---|---|---|
| 2,835,689 | Ziegler et al. | May 20, 1958 |
| 2,900,402 | Johnson | Aug. 18, 1959 |

FOREIGN PATENTS

| | | |
|---|---|---|
| 770,707 | Great Britain | Mar. 20, 1957 |
| 788,671 | Great Britain | Jan. 8, 1958 |
| 1,122,000 | France | May 14, 1956 |